Figure 1:
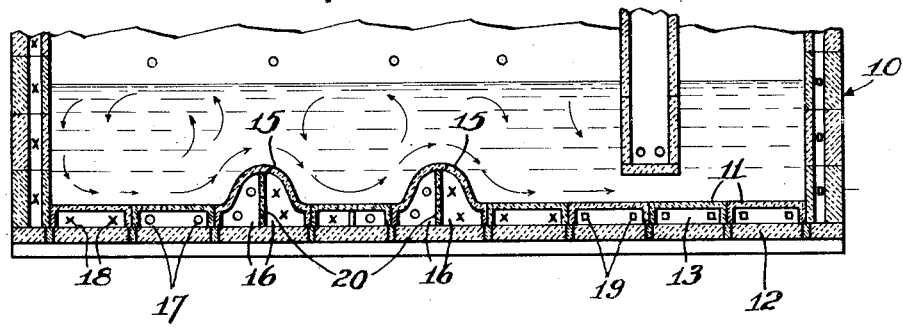

June 7, 1938.    H. H. BLAU ET AL    2,119,949
MEANS AND METHOD FOR TREATING GLASS
Original Filed June 8, 1936    2 Sheets-Sheet 1

WITNESSES
B. Wallace.
E. O. Johns

INVENTORS
Henry H. Blau
BY Kenneth K. Knaell
Brown, Critchlow & Flick
ATTORNEYS.

June 7, 1938.  H. H. BLAU ET AL  2,119,949
MEANS AND METHOD FOR TREATING GLASS
Original Filed June 8, 1936    2 Sheets-Sheet 2
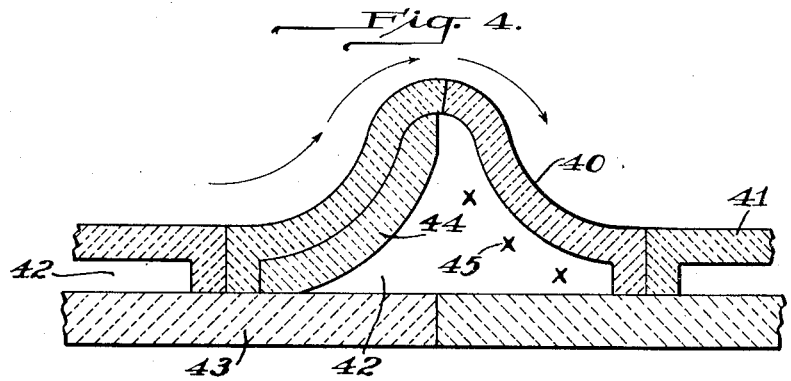
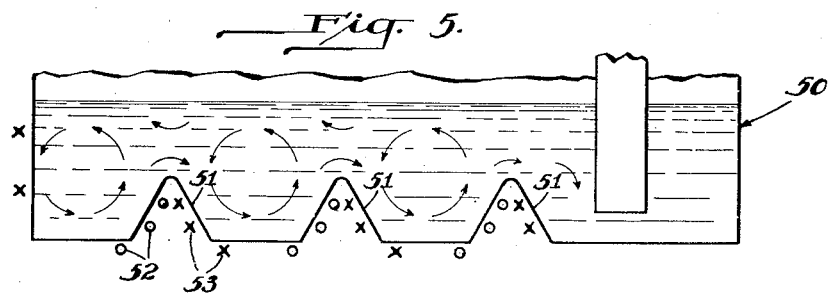
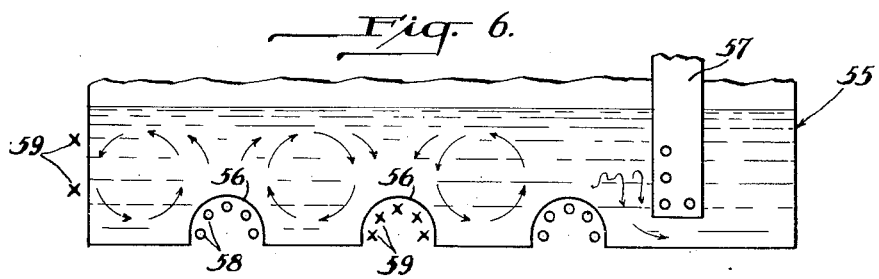
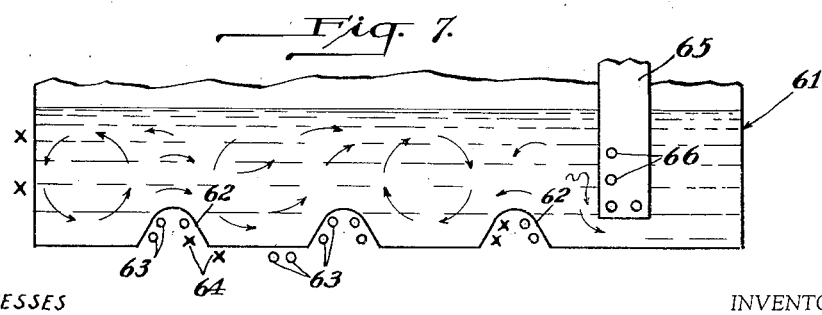
INVENTORS
Henry H. Blau
Kenneth K. Knaell
BY Brown, Critchlow & Flick
ATTORNEYS
WITNESSES
A B Wallace
E. O. Johns Patented June 7, 1938

2,119,949

UNITED STATES PATENT OFFICE 2,119,949

MEANS AND METHOD FOR TREATING GLASS

Henry H. Blau, Corning, N. Y., and Kenneth K. Knaell, Charleroi, Pa., assignors, by mesne assignments, to Corning Glass Works, Corning, N. Y., a corporation of New York Application June 8, 1936, Serial No. 84,028
Renewed May 5, 1938

19 Claims. (Cl. 49—54)

This invention relates to processes and apparatus for making glass, and more particularly is concerned with improved tank structure and methods of melting and refining glass.

In the manufacture of glass in continuous tanks and in day tanks it is desirable to heat the glass throughout the entire tank substantially uniformly and under such controlled conditions that a thorough mixing, melting and refining of the glass in the tank results with all parts of the glass remaining in the tank substantially the same length of time.

Prior to our invention the standard manner of melting glass in tanks has been through the use of gas burners positioned above the plane of the upper surface of the glass batch in the tank so that the upper surface or portions of the glass were highly heated and rendered very fluid compared with the relatively heavy viscous glass in the bottom and corners of the tank. This uneven heating of the glass resulted in some portions of the batch remaining in the tank too long and other portions not long enough to effect proper melting, and also in a reduction of tank capacity and melting efficiency.

Moreover, even if the amount of heat applied from above was very high, which increased the depth of the heated glass in the tank, nevertheless, the mixing and melting of the glass did not proceed uniformly throughout the entire body of glass in the tank due to improper or incomplete control of convectional and hydraulic flow of glass in the tank. By convectional flow is meant the flow of glass which is created by heating different portions of the glass different amounts so that the variation in specific gravities of the hotter and cooler glass causes glass flow. By hydraulic flow is meant the natural flow of glass resulting in the tank due to removal of glass at the refining end or chamber of the tank.

Some attempts have been made to control mechanically the flow of glass in tanks by baffles that have been square in cross-section so that they functioned primarily as dams or bridge walls to form quiescent pools of glass in the tank. This is because the glass instead of being mechanically directed by the baffles tends to remain behind them due to the square or rectangular cross-section of the baffles which do not cause the glass to flow over the surface of the baffles.

Likewise, it has been suggested heretofore to establish and control the convectional flow of glass in tanks through the use of alternately positioned burners and cooling means over the upper surface of the glass in the tank. Positioning the burners and cooling means over the glass prevents application of heat over the entire surface of glass and renders the uniform melting of the batch much more difficult. Moreover, in the application of heating and cooling means as just described the zones have extended only part way across the tank so that the resulting flow was not a vertical flow but was actually a horizontal flow back and forth in the tank with the glass gradually working towards its refining end. While this controlled flow somewhat improved the melting of the glass, the controlling and direction of glass flow was incomplete and unsatisfactory.

It is an object of our invention to avoid and overcome the foregoing and other difficulties of prior known practices and apparatus by the provision of an improved melting tank for glass, together with improved methods of melting the glass in the tank, whereby the quantity and quality of the glass produced in a given time is enhanced.

Another object of the invention is to provide a tank for treating glass, in which means are provided for mechanically controlling and directing hydraulic and convectional flow of the melted material in the tank, and wherein means are also provided for establishing and controlling convectional current flow of the melted material in the tank, whereby a uniform mixing and melting of the material is achieved.

Another object of the invention is the provision of an improved method of establishing and controlling convectional current flow in melting tanks through the application of heat to, maintenance of it in, or withdrawal of it from portions of the glass body, together with mechanical control of the flow.

Another object of the invention is to provide mechanical baffle means for directing glass flow in a melting tank with the baffles having means associated therewith for applying heat to, maintaining heat in, or withdrawing heat from the glass in contact with the baffle.

In the practice of our invention in the manufacture of glass the quantity of the glass produced in any given time is increased and its quality improved by mechanically interrupting and directing the glass flow while simultaneously effecting convectional glass flow through the use of heat differentials at different portions of the tank through the glass-engaging surfaces thereof, and particularly through the mechanical flow-interrupting and directing means.

Tank structures embodying the features of the invention, and adapted for use with the method just described, include bottom and side walls built up, at least in part, of relatively thin cast refractory blocks having high thermal conductivity, with means associated with the blocks for controlling the direction and amount of heat flow through the blocks. Baffles are associated with the walls of the tank and extend into the glass body to mechanically direct flow of the glass in the tank. The baffles are also formed of relatively thin cast refractory blocks having high thermal conductivity, and means are incorporated with the baffles for convectionally effecting and controlling the flow of glass about them. While various cast refractories, such as mullite, may be used for forming the baffles, the invention preferably uses fused cast refractories containing not less than about 80 per cent alumina, the remainder being chiefly silica. These high alumina cast refractories are quite resistant to corrosion and have relatively high thermal conductivity.

Figure 2:
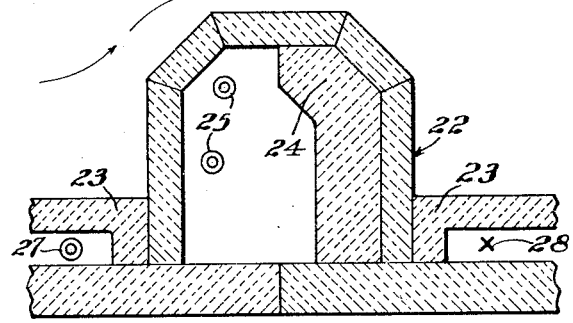
Figure 3:
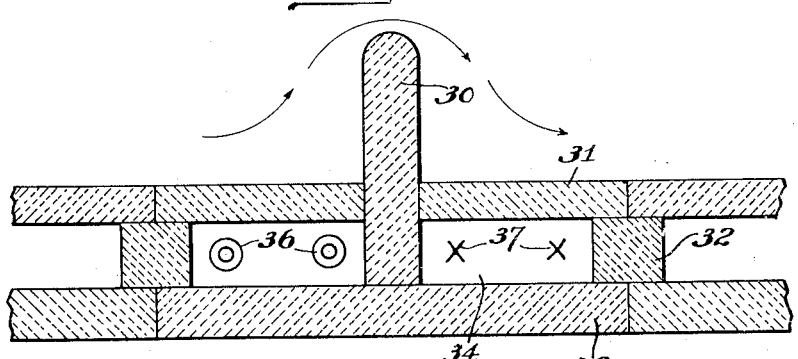

Referring to the drawings, Fig. 1 is a longitudinal vertical cross-sectional view illustrating a particular embodiment of a tank structure incorporating features of the invention; Fig. 2 is a transverse, vertical, cross-sectional view through a modified baffle construction illustrating its details; Fig. 3 is a view similar to Fig. 2 but of a second modified baffle construction; Fig. 4 is a view similar to Figs. 2 and 3 but illustrates still another modified baffle construction; Fig. 5 is a longitudinal, vertical, sectional view diagrammatically illustrating a method of operating a particular tank structure to establish definite convectional and hydraulic flow of glass in the tank; Fig. 6 is a view similar to Fig. 5 but illustrates a modified tank structure and method of operation; and Fig. 7 is a view similar to Figs. 5 and 6 and illustrating still another modification of the tank structure and method of operation.

As heretofore indicated, the invention is primarily concerned with the use of mechanical means for directing flow of glass in tanks and to means associated with the mechanical means for further establishing and controlling convectional glass flow to improve the character and increase the amount of glass made in a given tank in a certain time. These means and methods can be combined in many particular arrangements and steps, while achieving at least some advantages of the invention. However, certain particular combinations are believed most advantageous, and these are illustrated and described in detail.

In Fig. 1, the numeral 10 indicates generally a glass tank having bottom, end and side walls formed of channel-shaped, cast refractory blocks 11 which are backed with ordinary bonded refractory slabs 12 to form conduits 13 adapted to receive heating, cooling or insulating means. Such means may be positioned in the conduits 13, or the conduits may serve to convey heating or cooling gases, the particular combination depending upon the conditions of service.

Associated with the walls of tank 10 are baffles 15 formed of cast refractory material of high thermal conductivity and high resistance to corrosive attack. A suitable material is beta alumina formed by fusing alumina and about five percent of sodium oxide, the material being cast to form desired shapes. The baffles 15 may be incorporated in the side or end walls of the tank but, in the particular form of the invention illustrated, are associated solely with the bottom wall of the tank and extend transversely hereof. The baffles 15 are preferably made of a streamline cross-sectional surface contour so as to offer a minimum of resistance to the flow of glass thereover, while effectively directing the glass in the tank. The streamline contours of the baffles also reduce the corrosive cutting action of glass as it flows over them.

The baffles 15, as illustrated in Fig. 1, are formed hollow so that channels 16 are formed behind the baffles, with ordinary bonded refractory slabs 12 closing the channels 16 and forming the outer face of the tank. Positioned in the channels are heating and cooling means for establishing and controlling convectional flow of glass in the tank. The heating means have been diagrammatically indicated by circles 17 and the cooling means are indicated by crosses 18. Insulating means for maintaining heat in the glass adjacent with the blocks are indicated by squares 19. It will be seen from the drawings that wherever possible the joints in the refractories forming the baffles and the tank are positioned to open on cooling channels or ducts, so that possible seepage through the joints is largely eliminated. In addition to further eliminate seepage through the joints we contemplate maintaining a fluid pressure outside of the joint substantially equal and opposite to the pressure of the glass on the inside of the joint. This is readily accomplished in a cooling or heating duct with pressure providing means and relief valves as will be recognized.

The particular arrangement and position of the heat-applying means 17, the cooling means 18 and the heat-insulating means 19 are well illustrated in Fig. 1. Briefly, the rear or charging end wall of the tank is cooled to cause convectional flow of glass toward and downwardly adjacent to that wall so that any unmelted batch material is drawn towards the end wall and does not flow towards the refining end of the tank. The sides of the baffles facing towards the charging end wall are heated internally so that upwardly directed convectional currents of glass are established in these portions of the tank. The sides of the baffles remote from the feeding end wall are cooled internally to cause a downward convectional flow of glass over the baffle. Refractory slabs 20 are provided between the heating and cooling means in the baffles 15. Thus hydraulic and convectional glass flow is established in the tank in the directions illustrated by the several arrows, whereby thorough mixing and melting of the glass is achieved to improve the quality and increase the quantity of the glass produced in the tank.

The particular structure and arrangement of the baffles 15 in Fig. 1 may be varied. As shown in Fig. 2, the structure may comprise a semi-octagonal baffle, indicated generally by the numeral 22, formed in the bottom wall 23 of a tank. One-half of the baffle 22 is covered with heat-insulating means 24 to maintain heat in the glass which is in contact with that portion of the baffle. The other half is provided with heating means 25, the baffle 22, and also preferably the bottom tank wall 23, being made of cast refractory having high heat conductivity whereby the glass in contact with the baffle and the tank bottom is heated. Heating means 27 are associated with the tank bottom 23 adjacent the heated side of the baffle, and cooling means 28 are associated with the tank bottom at the insulated side of the baffle. As shown by arrows, there results a convectional flow of glass over the baffle 22 which is quite similar to that above described with reference to baffles 15. However, heat-insulating one side of the baffle, rather than cooling it, materially reduces the cooling and consequent downward flow of the glass on the one side of the baffle.

In the embodiment of the invention shown in Fig. 3 a relatively flat slab-like baffle 30 of cast refractory is incorporated in a tank wall including cast refractory blocks 31 backed with refractory spacers 32 and with an insulating backing facing 33 of ordinary bonded refractory. Positioned in channels 34 thus formed, there are heating means 36 and cooling means 37 whereby the glass at one side of baffle 30 is heated and that on the other side is cooled. This establishes a convectional flow of glass around the baffle as shown by arrows.

The baffle construction illustrated in Fig. 4 includes a cast refractory baffle 40 formed relatively thin in section and with a definitely streamlined surface contour. This baffle is placed in a wall 41 of the tank which may be made of channel-shaped blocks to form passageways 42 behind the blocks and baffles. Cover blocks or slabs 43 of refractory, such as ordinary bonded refractory, complete the wall structure. Positioned within baffle 40 in the passageway 42 are insulating means 44 which cover substantially one-half of the interior surface of the baffle. Cooling means 45 are positioned to cool the other half of the baffle whereby the convectional flow of glass shown by the arrows is established and directed over baffle 40.

While several tank structures and various baffle shapes have been illustrated and described, the tank may be constructed in any of the ways illustrated and described in our copending application Serial No. 84,029, filed June 8, 1936, and the baffle structures and arrangement, and particularly the surface contours, may take the form and position shown in our other copending application Serial No. 84,027, filed June 8, 1936.

The tank and baffle structures above described in conjunction with Figs. 1 to 4 particularly adapt themselves to methods of controlling and effecting uniform melting, mixing and refining of glass in tanks. Certain established and directed flows of glass have been generally described. Other methods are likewise contemplated for effecting and controlling convectional and hydraulic flow of glass in tanks. For example, Fig. 5 illustrates a glass tank, indicated generally by the numeral 50, having triangularly shaped baffles 51 extending transversely of the bottom. It should be understood that the walls of the tank and baffle are made of cast refractory material, as heretofore particularly described, so that they are adapted for the transmission of heat to, maintenance of heat in, or withdrawal of heat from the glass adjacent the baffles or the tank structure. In the particular embodiment of the invention illustrated, heating means, indicated by circles 52, are applied in the position shown, while cooling means, shown by the crosses 53, are likewise associated with the tank in the positions illustrated.

It will be seen that the charging end wall of the tank is preferably cooled to establish backward and downward convectional flow. The sides of the baffles 51 facing toward the charging end wall of the tank are heated internally to establish upward convectional glass flow, while the sides of the baffles remote from the feeding end wall are cooled internally to create downward convectional flow. As a result of the arrangement illustrated, flow of glass is established in the directions illustrated by the arrows, from which it will be recognized that a plurality of rotating volumes of glass are created longitudinally of the tank with the volumes rotating toward the charging end wall of the tank in the manner shown. The relatively sharp triangularly shaped baffles 51 effect a sharp up-throw of the glass, which, together with the rotating volumes of glass, creates an effective mixing and melting of the entire body of glass in the tank.

The glass in the tank is heated from above in the usual manner, and may also be heated or cooled through the walls of the tank in other than the positions particularly illustrated, if this be found desirable. The invention also contemplates, however, merely heating or cooling the glass through the baffles 51 with the remainder of the tank being made of thicker walls of ordinary bonded refractory without heating or cooling therethrough.

In Fig. 6 is shown another modification of tank structure and method of melting glass, the numeral 55 indicating generally a tank formed with a plurality of baffles 56 extending transversely of the bottom thereof. The baffles 56 are made semi-cylindrical in contour and are constructed of relatively thin cast refractory material having high thermal conductivity. The tank is provided with the usual bridge wall 57 which is also preferably formed of relatively thin cast refractory material. Heating means, indicated by the circles 58, and cooling means, indicated by the crosses 59, are associated with the baffles, bridge wall and, preferably, the feeding end wall of the tank in the positions illustrated. This embodiment of the invention particularly differs from that shown in Fig. 5 and described above in that certain of the baffles are heated over their entire inner surfaces while others are cooled over their entire inner surfaces.

With this arrangement of parts, oppositely-rotating longitudinally spaced volumes of glass, such as illustrated by the arrows, are established in the tank to effect a very thorough mixing and melting of the entire body of glass in the tank. The glass body is, of course, heated from above in the usual manner, and if desired the walls of the tank can, like the baffles 56, be made of relatively thin cast refractory with resulting heating and cooling of the glass through the walls. However, the invention also contemplates making the walls proper of the tank 55 of ordinary bonded refractory without heating or cooling through the walls.

Still another modification of the invention is illustrated in Fig. 7 wherein the numeral 61 indicates generally a tank construction having streamlined baffles 62 positioned in its bottom wall, with heating means, illustrated by the circles 63, and cooling means, illustrated by the crosses 64, being associated with the baffle structure in the manner shown. The baffles 62 and associated parts of the tank are made of cast refractory having high thermal conductivity and resistance to corrosion. The bridge wall 65 of the tank may also be constructed of cast refractory, heating means 66 being provided internally of the bridge wall. The rear wall or charging end wall of the tank 61 is preferably cooled for the purpose of establishing backward and downward convectional flow of glass, thereby preventing passage of unmelted glass through the throat to the refining end of the tank.

By the arrangement of parts just described, a convectional and hydraulic flow of glass is established in the tank 61, as shown by the arrows. This results in a very thorough mixing, melting and refining of the glass throughout the entire body of the tank and increases the output and improves the quality of the glass produced by the tank. This embodiment of the invention differs from those shown and described heretofore in that one of the baffles is heated throughout, another of the baffles is cooled on one side and heated on the other, while still a third baffle is cooled and heated on sides opposite to the first-mentioned baffle. This arrangement establishes a flow of glass shown by the arrows.

Inasmuch as the amount of heat which it is necessary to remove through the wall in a given area in order to accomplish the desired results is often quite large in any of the several modifications described, it has been determined that at times it is desirable to supplement ordinary air cooling of the refractory by water or other fluid pipes placed in or closely adjacent the cooling air channels. In the former case the heat is transferred to these pipes partly by radiation from the hot surfaces around them and partly by contact with the heated air, which air is thus cooled to a temperature at which it becomes able to again pick up heat upon recontact with the hot surfaces in its passage through the channel. Furthermore the rate of circulation of cooling fluid within the pipes may be varied over a wide range, thus permitting a much more extensive and yet finely flexible control over wall temperatures than is possible with air cooling alone or water cooling alone.

It is furthermore part of the inventive concept to pass cooling air through the channels or ducts provided for cooling and then use the resulting heated air for purposes of combustion to heat other portions of the furnace. This operation particularly adapts itself for use with auxiliary water or like cooling pipes in the cooling channels since the amount of air used for cooling need not exceed that which can be advantageously employed for combustion of the fuel in the glass tanks.

A feature of the invention not heretofore discussed resides in the provision of refractories of different heat absorption characteristics. More specifically certain of the refractory members positioned in zones adapted to cool the glass may be made of black or dark colored refractories so that heat and particularly infra-red heat rays are more readily absorbed thereby to effect the desired cooling. Likewise in zones adapted to heat the glass white or light colored refractories may be used to prevent heat and infra-red rays being taken up thereby. This combination of light and dark colored refractories can be employed in conjunction with or separately from the constructions herein described and illustrated.

From the foregoing it will be recognized that the stated objects of the invention are achieved by the provision of mechanical baffle means for directing and controlling flow of glass in tanks together with heat-applying, maintaining and withdrawing means for establishing and controlling the flow generally through the mechanical baffles themselves. Thus a very effective mixing and heating of the glass is achieved which insures a substantially uniform fluidity throughout the body of the glass with the entire tank being effective for heating without the presence of pocketed and quiescent glass.

In the practice of the invention a tank of a given size can be constructed and operated with a distinct increase in production over that of a similarly sized tank of former construction. Also a smaller tank made and used in accordance with the principles herein disclosed effects the same production as a larger prior art tank or a prior art tank using a greater amount of fuel for melting the glass.

While in accordance with the patent statutes several embodiments of the structure and method of the invention have been illustrated and described in detail, it should be appreciated that the invention is not limited thereto or thereby but is defined in the appended claims.

We claim:

1. A glass-melting tank comprising bottom and side walls built up at least in part of relatively thin cast refractory blocks having high thermal conductivity, means associated with the blocks for controlling heat flow through them, baffles in the tank mechanically controlling and directing flow of the glass in the tank, said baffles being formed of relatively thin cast refractory blocks having high thermal conductivity, and means associated with the baffles for convectionally effecting and controlling the flow of glass about the baffles.

2. In combination in a glass-melting tank a baffle extending into the tank and mechanically controlling flow of glass in the tank, and means associated with the baffle for heating the glass in contact with one and cooling glass in contact with another portion of the baffle to effect convectional flow of the glass about the baffle.

3. A glass-melting tank including bottom and side walls, baffles mechanically controlling and directing flow of the glass in the tank, said baffles being formed of relatively thin cast refractory blocks having high thermal conductivity, and means associated with the baffles for convectionally effecting and controlling the flow of glass.

4. A glass-melting tank including glass-contacting walls formed of heat-conductive, relatively thin refractory, means associated with the walls for controlling the amount and the direction of heat flow through them to establish and control convectional flow of glass in the tank, baffles formed on the tank walls and extending into the glass to mechanically control and direct hydraulic and convectional glass flow, said baffles being formed of heat-conductive, relatively thin refractory, and means associated with the baffles for controlling the amount and the direction of heat flow through the baffles to further control the flow of glass in the tank.

5. A glass-melting tank including glass-supporting walls, baffles formed on the tank walls and extending into the glass to mechanically control and direct hydraulic and convectional glass flow, said baffles being formed of heat-conductive, relatively thin refractory, and means associated with the baffles for controlling the amount and direction of heat flow through the baffles to further control the flow of glass in the tank.

6. In combination in a glass-melting tank, walls for surrounding and supporting the glass, a hollow baffle associated with a wall and formed of relatively thin, heat-conductive material, and means in the interior of the baffle for heating the glass through the baffle.

7. In combination in a glass-melting tank, walls for surrounding and supporting the glass, a hollow baffle associated with a wall and formed of relatively thin, heat-conductive material, and means in the interior of the baffle for maintaining heat in the glass in contact with certain portions of the baffle and for withdrawing heat from the glass and in contact with other portions of the baffle.

8. A glass-melting tank including means for mechanically directing glass flow in substantially streamlined paths, and means associated with the mechanical means for convectionally increasing and controlling the glass flow.

9. A glass-melting tank including means for mechanically directing glass flow, and means associated with the mechanical means for convectionally increasing and controlling the glass flow.

10. A tank for melting glass including a plurality of baffles extending transversely of the tank at longitudinally spaced intervals, means for cooling the glass through the charging end wall of the tank, means associated with the baffles for heating the glass adjacent the sides of the baffles toward the charging end wall, and means associated with the baffles for cooling the glass adjacent the sides of the baffles away from the charging end wall of the tank, whereby to create a plurality of rotating volumes of glass turning toward and down from the charging end wall of the tank.

11. A tank for melting glass including a plurality of upwardly extending baffles in the bottom of the tank, means for heating the glass adjacent one of the baffles, and means for cooling the glass adjacent another of the baffles.

12. A tank for melting glass including a pair of baffles extending into the glass, means for heating the glass adjacent one side of each baffle, means for cooling glass adjacent the other side of each baffle, said baffles being heated and cooled on opposite sides relative to each other.

13. The combination recited in claim 12 wherein a third baffle extends into the glass, and means associated therewith for applying heat to the glass adjacent the baffle.

14. That method of controlling flow of glass in tanks which comprises interrupting and directing the glass flow and simultaneously effecting convectional glass flow through the application of heat differentials applied to different portions of the tank through the glass-engaging surfaces thereof.

15. That method of intimately mixing the constituents of a glass batch which comprises causing the entire portion of glass adjacent to a glass-contacting surface of the tank to move bodily towards the center of the tank in streamline flow, heating upwardly directed portions and cooling downwardly directed portions of the flow.

16. The method of improving uniform mixing and melting of glass in a tank which comprises mechanically controlling and convectionally establishing and controlling a plurality of distinct volumes longitudinally of the tank wherein the glass rotates downwardly and back towards the charging end of the tank.

17. That method of mixing and melting glass which comprises applying heat throughout substantially the entire depth of the glass to zones of glass in a tank, withdrawing heat throughout substantially the entire depth of the glass from alternate zones between the heated zones and directing the resulting convectional flow.

18. In a glass-melting tank, substantially parallel hollow baffles of relatively thin heat-conductive material, means positioned within a baffle for heating the glass through the baffle over substantially its entire surface, means positioned within another baffle for heating the glass through a portion of the baffle and cooling the glass through another portion of the baffle.

19. In a glass-melting tank, substantially parallel hollow baffles of relatively thin heat-conductive material, means positioned within a baffle for heating the glass through the baffle over substantially its entire surface, and means positioned within another baffle for cooling the glass through substantially the entire surface of the baffle.

HENRY H. BLAU.
KENNETH K. KNAELL.